United States Patent [19]

Tewksbury

[11] 3,753,112

[45] Aug. 14, 1973

[54] COMMUNICATION SYSTEM WITH SAME FREQUENCY REPEATER STATION CAPABILITY

[75] Inventor: John Merle Tewksbury, Baltimore, Md.

[73] Assignee: The Bendix Corporation, Southfield, Mich.

[22] Filed: Feb. 23, 1972

[21] Appl. No.: 228,532

[52] U.S. Cl. ........................ 325/13, 325/21, 325/64, 325/141

[51] Int. Cl. ............................................ H04b 7/18

[58] Field of Search ...................... 325/13, 21, 38 R, 325/58, 64, 141, 143, 4–6, 8

[56] References Cited

UNITED STATES PATENTS

| | | | |
|---|---|---|---|
| 2,444,452 | 7/1948 | Labin | 325/13 |
| 2,852,610 | 9/1958 | Levine | 325/13 |

*Primary Examiner*—Albert J. Mayer
*Attorney*—William G. Christoforo

[57] ABSTRACT

A communication system with same frequency repeater station capability operates on a single channel and generally includes at least one repeater station which receives and transmits simultaneously on a single frequency, and a plurality of remote receiver transmitting stations, all of which operate on the same frequency as the repeater station. The repeater station includes a continuously operating transmitter, the keying of which is controlled by a local oscillator. Each of the remote stations includes a similar transmitter which is normally quiescent, but which is energized for local modulation and transmission by a push-to-talk button. Each cycle of the repeater station oscillator is modified by pulses received from a remote transmitting station, to reduce or increase the period as needed to produce identical periods and synchronization in each oscillator. The pulses received at the repeater station are not perceptible during its own transmission and hence, no control is then exerted. Hence, an equilibrium condition is immediately established at the repeater station in which the departure from coincidence of transmitted and received pulses at the repeater station is proportioned to its need for control. The transmissions from the repeater station are received by the remote stations not then transmitting. Intelligent modulation of the pulse period at these receiving remote stations is then evident and may be recovered.

9 Claims, 6 Drawing Figures

COMMUNICATION SYSTEM WITH SAME FREQUENCY REPEATER STATION CAPABILITY

BACKGROUND OF THE INVENTION

This invention relates to communication systems and more particularly to communication systems which include a repeater station for extending the range of the system. Repeater stations are known to be useful in applications where it is desirable to extend the range of a particular communication system. The repeater station is normally mounted generally centrally within the system, preferably on a high structure or on a mountain top in order to obtain coverage in areas having rough terrain. A repeater station installed in an artificial satellite permits communications between stations separated by thousands of miles.

Development of a same frequency repeater capability within a communication system has been the object of considerable research. Time multiplex and split channel systems have been built, tested and used. However, these systems have the disadvantage that the stations in the network operate on different frequencies or in different time slots in order to overcome the problems associated with the repeater stations since it has been all but impossible to the present time to produce a repeater station which simultaneously receives and transmits on the same frequency.

SUMMARY OF THE INVENTION

The communication system to be described includes remote stations, each of which suitably includes a continuously operating receiver and a transmitter energized by a push-to-talk switch. In addition, the system contains at least one same frequency repeater station whose receiver and transmitter are continuously operating. The system employs a modulation technique which is compatible with efficient operation of a same frequency repeater. Since the stations in the network are generally all alike and operating at the same frequency they can communicate equally well with each other directly or through the repeater station.

In this system the stations in the network communicate by means of pulse time modulation, remote stations operating on a push-to-talk basis. For example, when transmitting, a remote station will pulse a carrier frequency on and off at a relatively low repetition frequency with a pulse length in the order of one-quarter the pulse period. During modulation, the pulsewidth and pulse amplitude remain constant and the time between pulses is varied in accordance with the modulating signal.

A receiver demodulates the r.f. signal and delivers the pulses to an integrator circuit. Since the average value of the voltage in the pulse train is, in effect, varied by the modulating signal at the transmitter, the modulation will be present at the output of the receiver integrator circuit. The recovered audio signal is amplified and applied to the output of the receiver, suitably a loadspeaker or headphones.

With this modulation system it is possible for stations to communicate with one another on a push-to-talk basis at distances limited only by the characteristics of the radio signal path.

The system same frequency repeater station includes a carrier frequency transmitter which is keyed by a voltage tunable oscillator which has a basic frequency generally equal to the relatively low, remote station control frequency. The transmitter sends out pulses having a pulsewidth approximately equal to the duration of the remote station pulses and a nominal repetition rate determined by the voltage tunable oscillator. The receiver section of the same frequency repeater station is connected to the oscillator through logic circuits which force the transmitter to send its pulses in exact synchronism with any like pulses it receives. Thus, a remote station within range of the same frequency repeater station will receive from the repeater station the identical signal simultaneously being transmitted by the transmitting remote station.

Accordingly, it is an object of this invention to provide a means of mutual communication over a single space channel.

It is another object of this invention to provide a single frequency communication system having same frequency repeater station capability.

One further object of this invention is to provide a communication system of the type described having same frequency repeater station capability wherein the repeater station receives and transmits simultaneously at the same frequency.

These and other objects of the invention will be made apparent as the following description of the preferred embodiment and the drawings proceeds.

DESCRIPTION OF THE PREFERRED EMBODIMENT

Figure 1:
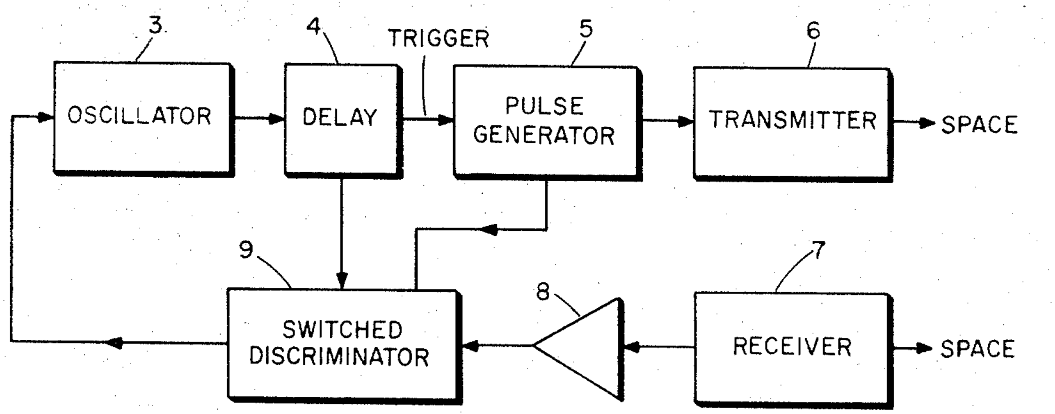
FIG. 1 is a block diagram of a same frequency repeater station of the type suitable for use in the invention.

Refer to the figures wherein like elements are designated by like reference numerals and refer particularly to FIG. 1. In FIG. 1 a relaxation oscillator 3 operates as a free running pulse generator whose output comprises a train of pulses position modulated with respect to information received from a switched discriminator 9. The output pulses from oscillator 3 are conveyed to a delay circuit 4, suitably a one-shot, to thereby trigger the one-shot to generate an output pulse from each input pulse applied thereto. A pulse generator 5 is triggered by the trailing edge of the one-shot output pulses, thereby introducing a fixed time delay between a predetermined transition of the oscillator 3 output pulses and the triggering of pulse generator 5. Pulse generator 5 produces a constant duration output pulse which is then used to turn on transmitter 6 which thereby radiates into space a bundle of carrier frequency signals defining a pulse of constant duration, the pulse being position modulated with respect to information received at oscillator 3, from switch discriminator 9 as has previously been discussed.

A receiver 7, adapted to the mode of communication of the particular system, is coupled to space by the same or parallel means as the transmitter so that it responds to the transmitter 6 associated with it and to similar transmitters in other transceivers within the network. Receiver 7 drives a limiting amplifier 8 so that the received pulses are presented to a switch discriminator 9 as a train of square waves having abrupt transitions between two fixed values of voltage or current. In switched discriminator 9 the received pulses are compared to a pulse from the delay 4 and pulse generator 5. If the switch discriminator determines that there is coincidence of the received pulse with the transmitted pulse it will generate no signal to vary the normally free running output of oscillator 3. However, a received pulse starting before the locally transmitted pulse will change the output in a first sense in proportion to the departure from coincidence, and a received pulse occurring later than the locally transmitted pulse will change the output similarly in the opposite sense. A received pulse beginning before and ending after the transmitted pulse will produce a net change proportional to the departure from coincidence of the medium points of the transmitted and received pulses. As previously mentioned, the output of discriminator 9 is applied to oscillator 3 to control its pulse-to-pulse period so that an output from the discriminator 9 in the first sense will hasten the occurrence of the next pulse and an output in the opposite sense will retard the occurrence. Thus, while the repeater station of FIG. 1 is receiving pulses from a remote station it will retransmit these pulses in synchronism with the received pulses.

Figure 2:
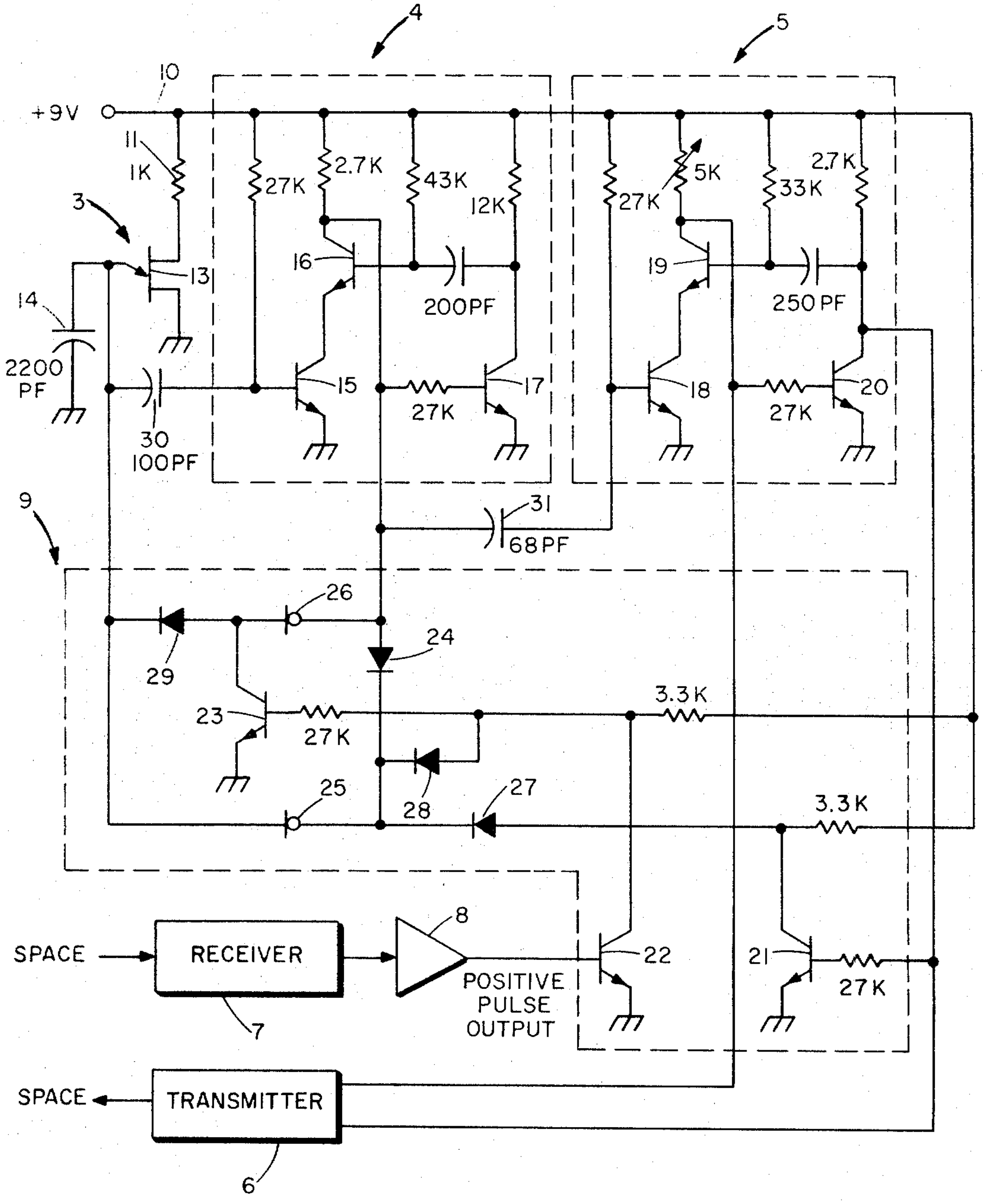
FIG. 2 is a modified schematic showing in greater detail the same frequency repeater station of FIG. 1.

FIG. 2 is a modified schematic illustrating the same frequency repeater station of the type suitable for use in this invention. In FIG. 2 the active element of the oscillator 3 of FIG. 1 is the unijunction transistor 13 which is connected in series with resistor 11 between ground and a voltage bus 10. In this embodiment bus 10 is a source of +9 volts. The emitter electrode of unijunction 13 is connected to one plate of capacitor 14 whose other plate is grounded. The capacitor 14 discharge path is through unijunction 13 which, as will be shown below, periodically discharges the capacitor. The unijunction transistor used in this circuit is suitably a 2N2646, an annular silicon PNP type and all other transistors shown are suitably 2N2222, annular star silicon NPN types useful as high speed switches and general purpose amplifiers to the VHF range.

The active elements of the delay 4, which it can be seen is a one-shot, are the transistors 15, 16 and 17. In the quiescent state transistor 17 is non-conductive and transistors 15 and 16 are saturated. When capacitor 14 discharges through unijunction 13, a brief negative pulse is applied through capacitor 30 to the base electrode of transistor 15 thus turning that latter transistor off. Since the collector-emitter circuit of transistor 15 is serially connected with the collector-emitter circuit of transistor 16, transistor 16 is also turned off causing the voltage at its base and collector electrodes to rise thus saturating transistor 17 for a period determined by the time constants of the circuit. In the embodiment shown, this period is 6 microseconds. Upon recovery of the delay 4, transistor 17 once more turns off and transistors 15 and 16 turn on. The voltage at the collector electrode of transistor 16 thus drops. A resultant negative pulse is conveyed through capacitor 31 to the base electrode of transistor 18, thus turning that transistor off. The pulse generator 5 is comprised of transistors 18, 19 and 20 where transistors 18 and 19 are saturated and transistor 20 is off in the quiescent state of the pulse generator. The operation of the pulse generator is similar to the operation of the delay 4, hence when transistor 18 is triggered non-conductive, transistor 20 is triggered into the conductive state. The resultant output pulse of pulse generator 5 is now available either at the collector of transistor 19 or 20. The pulse generator output pulse, which in the embodiment shown has a duration of 8 microseconds, is applied to transmitter 6 to turn on that transmitter during the output pulse. Normally only one connection need be made between transmitter 6 and pulse generator 5 depending on the nature of the space link into which the transmitter is operating and the method of keying the transmitter.

In FIG. 2 the switched discriminator 9 is comprised of transistors 21, 22 and 23 together with diodes 24, 27, 28 and 29 and current limiting devices 25 and 26, together with other shown associated components. Recharging of capacitor 14 is controlled by the switched discriminator as will now be explained. Immediately upon discharge of capacitor 14 through unijunction transistor 13, the collector of transistor 16 rises from about 0.4 volts to the voltage of the supply, in this embodiment 9 volts. Current flows through diode 24 and current limiting device 25 to capacitor 14. Although current limiting device 26 and diode 29 are serially connected between the collector electrode of transistor 16 and the emitter electrode of unijunction 13 as are diode 24 and current limiting device 25, current now flowing through current limiting device 26 is diverted to ground through transistor 23 which at this time is biased conductive, assuming that no signal is being instantaneously received by receiver 7 so that transistor 22 is non-conductive. It can be seen that current could normally flow through diode 28 and current limiting device 25 to the base electrode of unijunction 13. However, current limiting device 25 is saturated due to the current flowing through diode 24 and thus no additional charging current is supplied to capacitor 14 because of diode 28 at this time. Although for the same reason no additional charging current could be introduced because of diode 27, this diode at this time is also ineffective because transistor 21 is now conductive due to the high voltage at the collector electrode of transistor 20, thus grounding the anode electrode of diode 27.

At the conclusion of the output pulse of delay 4 the collector of transistor 16 will revert to a low voltage. Pulse generator 5 is triggered, as previously discussed, causing the voltage at the collector electrode of transistor 20 to drop towards ground, thus grounding the base electrode of transistor 21 to cut off that latter transistor. Thus, at the same time the charging path through diode 24 and current limiting device 25 is interrupted a new charging path is established through diode 27 and current limiting device 25 into capacitor 14. During the period of the output pulse from pulse generator 5 the charging of capacitor 14 will continue. Note, that during this time even though a signal should be received by receiver 7 either from a remote station or coupled from the local transmitter so that transistor 22 becomes conductive, thus permitting transistor 23 to turn off, no additional current will be supplied to the path comprised of current limiting device 26 and diode 29 to capacitor 14 since this current path supply source at the collector of transistor 16 is now effectively at ground. At the completion of the pulse generator 5 output pulse the voltage at the collector electrode of transistor 20, and hence at the base electrode of transistor 21, again rises so that transistor 21 again becomes conductive to ground the anode electrode of diode 27. However, charging of capacitor 14 continues through isolation diode 28 and the same current limiting device 25 until capacitor 14 reaches the trigger potential of the unijunction transistor 13. As previously mentioned the description of the operation of the circuit of FIG. 2 to this time has assumed that there is no output from receiver 7 except for that derived from its associated transmitter 6. Thus, when no remote signal is being received the charging current into capacitor 14 occurs at a constant rate determined by the characteristics of current limiting device 25.

Figure 5:
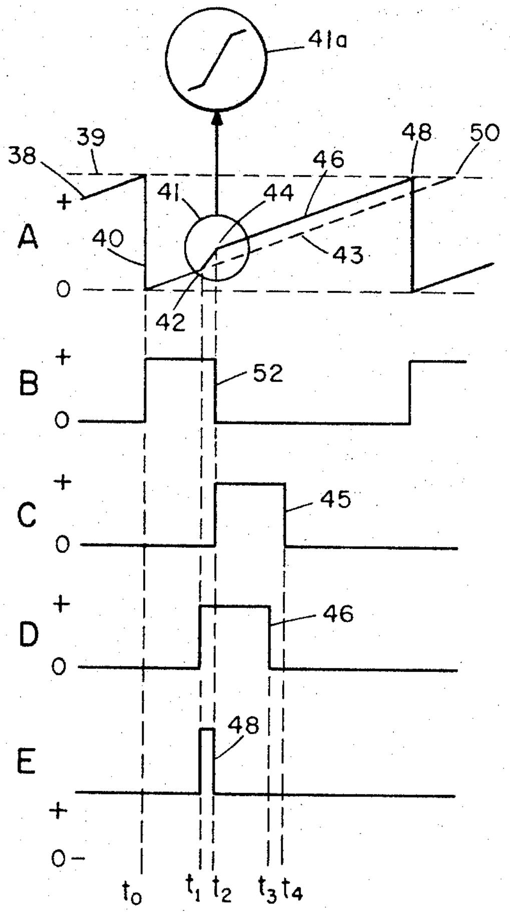
FIGS. 5 and 6 include time graphs of signals at various points in the circuit of FIG. 2 and are useful in explaining the operation of that figure.

Referring now also to FIG. 5 and assume further that a signal from a remote unit is present at the repeater station. Also assume that the signal arrives at the repeater station during the period of the delay 4 output pulse, a situation that will normally occur when the remote unit has a somewhat shorter natural pulse to pulse period than the repeater station. At line A of FIG. 5 a positive potential line 39 represents the potential at which the unijunction 13 is triggered while ramping line 38 represents the potential level across capacitor 14. Capacitor 14 discharges along vertical line 40 to a base reference and then once again begins to ramp upward. As previously mentioned, upon discharge of capacitor 14 delay 4 is triggered to generate an output represented as 52 on line B of FIG. 5. The time of discharge of capacitor 14 is taken as time $t_0$. At time $t_1$, which is during the period of the delay 4 output pulse, a pulse from a remote station is received at the repeater station. This received pulse, for example, is pulse 46 at line D of FIG. 5. Referring again to FIG. 2 it will be remembered that during the delay output pulse charging of capacitor 14 is through diode 24 and current limiting device 25 in the absence of a received pulse. However, upon the occurrence of pulse 46 transistor 22 becomes conductive, thus grounding the base electrode of transistor 23 and turning that transistor off. A new charging circuit comprised of current limiting device 26 and diode 29 parallel to the existing charging circuit consisting of diode 24 and current limiting device 25 allows additional current to be supplied to capacitor 14. This additional charging current is represented by pulse 48 at line E of FIG. 5. Whereas previous to the receipt of the remote pulse capacitor 14 had been charging along slope 38, now at point 42 (FIG. 5) additional current is applied to the capacitor so it charges at a greater rate as represented between points 42 and 44. For the sake of clarity, the discontinuity 41 in the capacitor charging characteristic is shown magnified in insert 41*a*. At time $t_2$ pulse 52 terminates extinguishing the previous positive voltage at the collector electrode of transistor 16. Thus, no further current will be supplied to capacitor 14 through current limiting device 26 or through diode 24 after time $t_2$. As previously explained, pulse generator 5 is triggered by the trailing edge of pulse 52 to generate its output pulse, represented at 45 in FIG. 5. Pulse 45 turns off transistor 21 so that between time $t_2$ and $t_3$ (the trailing edge of pulse 46) current is supplied to capacitor 14 through diode 27 and current limiting device 25. At time $t_3$, the trailing edge of received pulse 46 transistor 22 turns off restoring positive voltage at the anode of diode 28. However, current limiting device 25 is already saturated by the current passing through diode 27. At time $t_4$ pulse 45 is extinguished and transistor 21 again becomes conductive to thereby ground the anode of diode 27. Capacitor 14 charging current now continues through diode 28 and current limiting device 25 until unijunction 13 is triggered. It can be seen that whereas in the absence of a received pulse the capacitor would have continued charging along dotted line 43 and been discharged at point 50 it now, after receipt of the remote pulse and the discontinuity of 41, will charge along line 46 and discharge at point 48, thus tending to move the output pulse of the repeater transmitter into synchronization with the received pulse.

Figure 6:
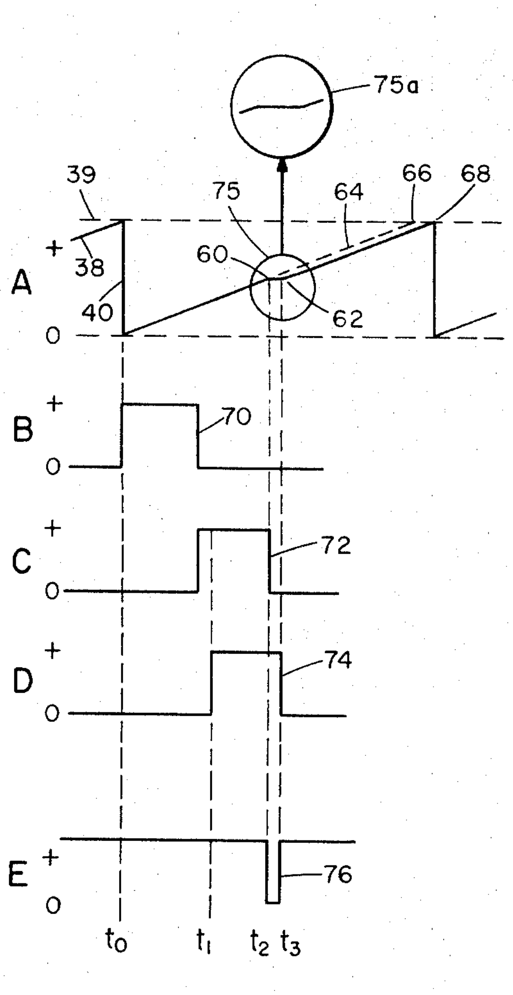

FIG. 6 is useful in explaining the operation of the circuit of FIG. 2 when a portion of the remote pulse is received at the repeater station after the termination of the locally transmitted pulse. The ramping curve 38 again represents the charging of capacitor 14 and line 39 again represents the potential at which unijunction 13 is triggered. Vertical line 40 represents the discharging of capacitor 14 through unijunction 13, resulting in the generation of the delay output pulse represented at 70. The discharge of capacitor 14 is again taken at $t_0$. At the trailing edge of pulse 70 pulse generator 5 generates an output pulse represented at 72. It is assumed that at time $t_1$, a time somewhat after the leading edge of pulse 72, a remote pulse 74 is received at the repeater station. Returning to FIG. 2 it will be remembered that during the pulse generator 5 output pulse 72 the collector of transistor 20 approaches ground, thus turning off transistor 21 so that capacitor 14 can be charged from line 10 through diode 27 and current limiting device 25. Even though a remote pulse may be received during this time so that transistor 22 becomes conductive grounding the base of transistor 23 and turning that transistor off, since there is no voltage at the collector of transistor 16 no additional current may be supplied to capacitor 14 through current limiting device 26 and diode 29. However, at the completion of pulse 72 transistor 21 once more becomes conductive so that no current is applied to capacitor 14 through diode 27 and current limiting device 25. In addition, since in the presence of an assumed receiver input transistor 22 is conductive, there is no voltage drive available at the anode of diode 28. It will be remembered that in the absence of a received pulse current is supplied to capacitor 14 through diode 28 and current limiting device 25 after the termination of pulse 72. However, it is presently assumed that a pulse is received after the termination of pulse 72, that is between time $t_2$ and $t_3$. Thus, during this latter time interval the voltage at the collector electrode of transistor 16 is at ground, together with the voltage at the anode of diodes 27 and 28 so that no current can be supplied to capacitor 14. This is represented at line A of FIG. 6 by the horizontal line between points 60 and 62 comprising discontinuity 75. For clarity the discontinuity is magnified at insert 75*a*. At the completion of the received pulse, that is the time $t_3$, transistor 22 becomes non-conductive and voltage is available at the anode of diode 28 to thus supply current to capacitor 14 through that latter diode and current limiting device 25. Thus, from point 62 curve 38 will ramp upward until the potential of line 39 is attained at capacitor 14. It will be noted that had no remote pulse been received, curve 39 would have continued from point 60 along broken line 64 to point 66 where capacitor 14 would have been discharged. It should now be clear that once again the transmitted pulses from the repeater unit will synchronize with the pulses received from a remote unit. The pulse 76 occurring between times $t_2$ and $t_3$ is illustrative of the fact that during this time no current is supplied to capacitor 14.

In the case where a pulse is received at the repeater station prior to the repeater station transmitted pulse from one remote station and another pulse is received at the repeater station after the repeater station transmitted pulse from a second remote station the repeater station transmitted pulse will assume a position corresponding to a medium between the two received pulses.

Figure 3:
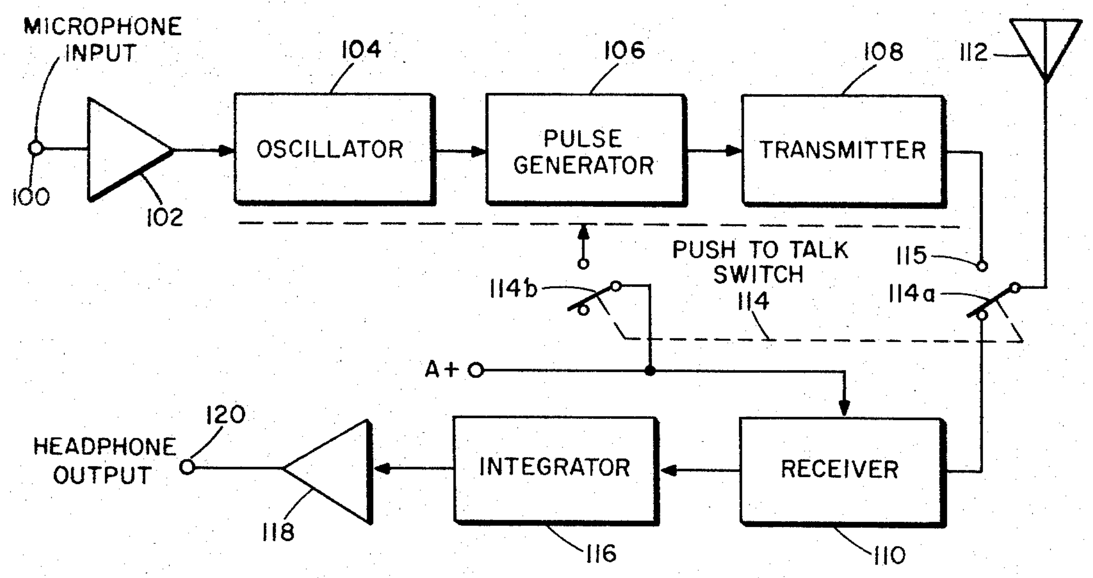
FIG. 3 is a block diagram of a remote station which is suitable for use with the invention.

Refer now to FIG. 3 which is a block diagram showing a remote station suitable for use with the invention. Assume first that push-to-talk switch 114 is closed, that is, switch section 114*b* is closed and switch arm 114*a* connects to terminal 115. A free running relaxation oscillator 104, similar to the oscillator previously described, generates a train of pulses which is applied to a pulse generator 106. In response to the pulses applied thereto the pulse generator 106 generates pulses standardized in duration. The duration of these pulses is generally equal to the pulses transmitted by the repeater station. The pulses from pulse generator 106 are applied to key transmitter 108 so that it generates a constant duration output pulse comprised of a bundle of high frequency carrier waves for each applied pulse. The pulse spacing is varied in accordance with an intelligence signal, suitably from a microphone at terminal 100 and through amplifier 102 to oscillator 104. The resultant signal from transmitter 108 is radiated from antenna 112.

The receiver section is comprised of receiver 110 which, when the push-to-talk switch 14 is in the position shown, has the signals received at antenna 112 applied thereto, the output of the receiver then comprising a pulse train. The intelligence in the pulse train is recovered by integrator 116, amplified by amplifier 18 and made available by some utilization device at terminal 120, suitably a headphone.

When the unit of FIG. 3 is in the transmitting mode, that is with switch 114*a* connecting to terminal 115 and switch 114*b* closed a portion of the transmitted signal will be induced into the receiver section of the unit and hence will be available at the unit headphones as a sidetone.

Figure 4:
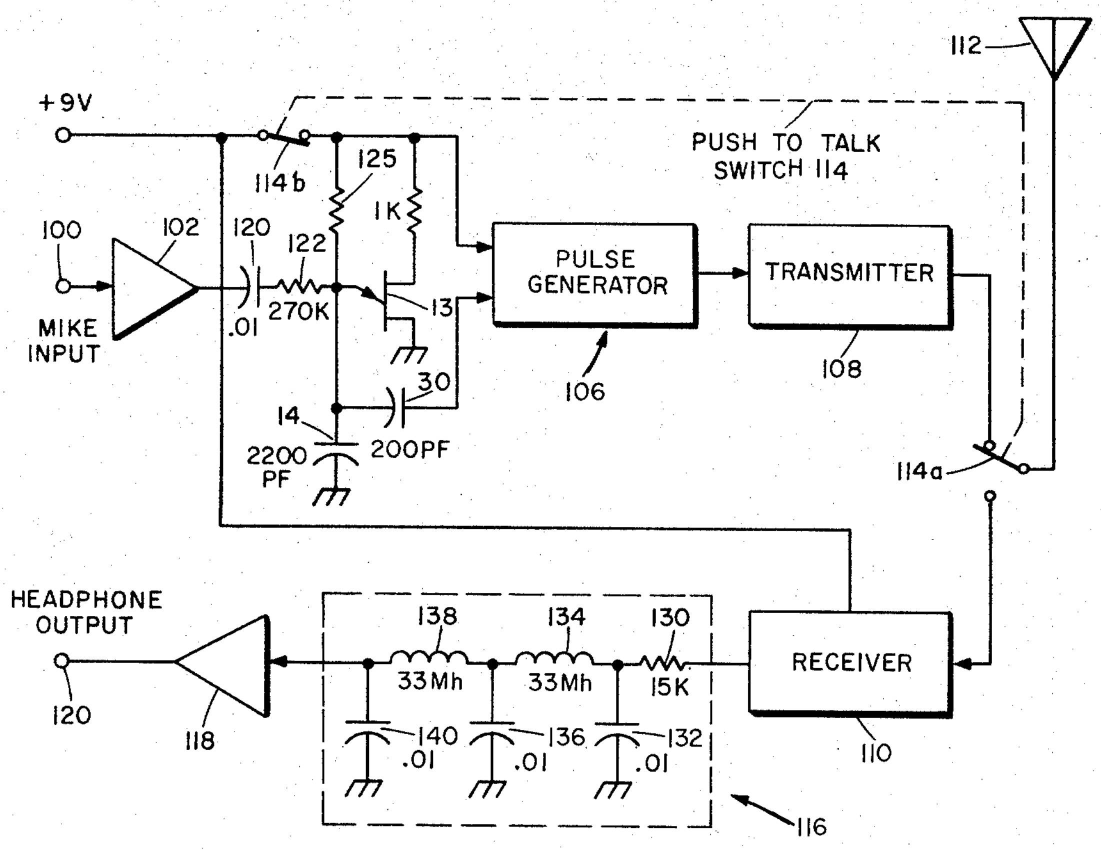
FIG. 4 is a modified schematic showing in greater detail the remote station of FIG. 3.

Refer now to FIG. 4 where pulse generator 106 and transmitter 108 are generally identical to the pulse generator 5 and transmitter 6 of FIG. 2. Note that in this figure the push-to-talk switch is shown in the depressed or talk position. Unijunction transistor 13 and capacitors 14 and 30 are identical to like labeled elements of FIG. 2. As before, capacitor 14 is discharged through unijunction 13 when the potential thereacross reaches the trigger potential of the unijunction. In this case, however, capacitor 14 is charged from a positive voltage line through resistor 125. The value of elements 14 and 125 are chosen by the system designer to make the free running pulse repetition frequency of the remote station equal to the free running pulse repetition frequency of the repeater station. The rate of charge of capacitor 14 is varied, however, by an intelligence signal applied at terminal 100, amplified by amplifier 102 and coupled to the unijunction emitter electrode through capacitor 120 and resistor 122. Hence, as should now be understood, the output pulses from this remote station will be pulse position modulated in accordance with an input intelligence signal.

The discharge of capacitor 14 triggers pulse generator 106 through capacitor 30. The output pulses from pulse generator 106 key transmitter 108 to transmit into space via antenna 112. When intelligence is no longer to be transmitted the push-to-talk switch 114 is released thus disconnecting the voltage bus via switch arm 114*b* from the oscillator and pulse generator. In addition, switch arm 114*a* connects antenna 112 directly to receiver 110. Any pulses received will be demodulated by integrator 116. This integrator consists of resistor 130 serially connected with inductances 134 and 138 connected between the receiver output and the input of amplifier 118. In addition, the integrator consists of filter capacitors 132, 136 and 140, each of which has one plate grounded and the other plate connected respectively to the junction between elements 130, 134, 138 and 118. The demodulated intelligent pulses are amplified by amplifier 118 and available for use at output terminal 120.

It will be noted that the schematic of a remote station is very similar to the schematic of the repeater station, at least insofar as the transmitter portion is concerned. The exception is the means by which capacitor 14 is charged and also the fact that the remote station does not need the delay 4 of the circuit of FIG. 1 and hence it is not provided.

It will be noted with respect to a repeater station that when the repeater station is relaying intelligence it will generally be receiving immediately before and immediately after it transmits a pulse. In order to permit the repeater unit to recover rapidly after a transmission so it can be prepared to receive a signal, the sensitivity of that unit must be made quite poor. However, in the case of the remote station the transmitter is turned off while the station is receiving. Hence the station can be made quite sensitive. It might now appear to one skilled in the art in light of the teachings here and in earlier teachings that microphone input similar to that shown in FIG. 4 can be used with the circuit of FIG. 2 together with an integrator similar to that seen in FIG. 4 to produce a common station capable of transmitting, receiving or acting as a repeater station. However, the aforementioned poor sensitivity of this type of station will limit the range of the resultant network. In addition, certain transit time effects will limit the range of a system where all the stations are similar to that shown at FIG. 2.

The invention claimed is:

1. A same frequency repeater system which includes at least one repeater station and one remote station wherein said repeater station comprises:

means for generating a first train of pulses;

means for receiving at least a second train of pulses from a remote station;

synchronizing means for adjusting the spacing between the pulses in said first train of pulses for substantial coincidence with the pulses in said second train of pulses whereby said first train of pulses is modulated; and, means for transmitting the modulated first train of pulses; and wherein said remote station comprises a transmitter section and a push-to-talk switch for energizing said transmitter section only when said push-to-talk switch is activated, wherein said transmitter section comprises:

means for generating said second train of pulses;

means for adjusting the spacing between the pulses in said second train of pulses in accordance with an applied intelligence signal whereby said second train of pulses is modulated; and means for transmitting the modulated second train of pulses.

2. The system of claim 1 wherein said synchronizing means comprises:

a timing network connected to said means for generating a first train of pulses to establish the spacing between the pulses of said first train, the last named means comprising an active device connected in said timing network and responsive to a first energy condition therein to switch it to a second energy condition to maintain oscillations therein; and, means responsive to said second train of pulses for controlling the return of said timing network from said second energy condition to said first energy condition.

3. A same frequency repeater system which includes at least a remote station comprising:

means for generating a train of pulses;

means for varying the spacing between the pulses of said train of pulses in accordance with an applied intelligence signal whereby said train of pulses is modulated to include the intelligence of said intelligence signal;

means for transmitting the modulated train of pulses;

switch means operable to permit said remote station to transmit the modulated train of pulses; and wherein said same frequency repeater system additionally includes at least a repeater station comprising:

means for receiving said modulated train of pulses from said remote station;

means responsive to the received train of pulses for generating a second train of pulses in substantial synchronization with said received train of pulses; and, means for transmitting said second train of pulses.

4. The system of claim 3 with an additional station receiving said modulated train of pulses for recovering said intelligence signal therefrom.

5. The system of claim 4 wherein said addition station includes a pulse integrator for recovering said intelligence signal.

6. The system of claim 3 wherein said remote station includes means for receiving second pulse trains and for recovering intelligence signals therefrom.

7. A single channel communication system which includes at least a remote station having a transmitting section, a continuously energized receiving section and a push-to-talk switch effective to energize said transmitting section, said transmitting section comprising:

an oscillator;

a keying circuit responsive to said oscillator for generating a pulse of fixed duration once in each cycle of said oscillator;

a timing network connected in said oscillator for establishing the period of said oscillator in response to an intelligence signal applied thereto;

means for applying an intelligence signal to said timing network means for transmitting the pulses of fixed duration; and wherein said communication system additionally includes a repeater station for receiving a signal from said remote station and for amplifying and retransmitting said signal received from aid remote station simultaneously with the signal received and at the same frequency.

8. The system of claim 7 wherein said oscillator comprises an active device responsive to a first energy condition in said timing network to switch it to a second energy condition to maintain oscillations, said timing network being responsive to said intelligence signal to return said timing network from said second energy condition to said first energy condition.

9. The system of claim 7 wherein said repeater station comprises:

another oscillator;

another keying circuit responsive to said oscillator for generating a pulse of fixed duration once in each cycle of said oscillator; and, timing network connected in said oscillator for establishing the period of said oscillator in response to the signal received from said remote station.

* * * * *

UNITED STATES PATENT OFFICE
CERTIFICATE OF CORRECTION

Patent No. 3,753,112 Dated July 14, 1973

Inventor(s) John M. Tewksbury

It is certified that error appears in the above-identified patent and that said Letters Patent are hereby corrected as shown below:

At column 3, line 5, "square" should be --squared--.
At column 5, line 64, insert a comma after "46".

Signed and sealed this 19th day of February 1974.

(SEAL)
Attest:

EDWARD M.FLETCHER,JR.
Attesting Officer

C. MARSHALL DANN
Commissioner of Patents